United States Patent Office.

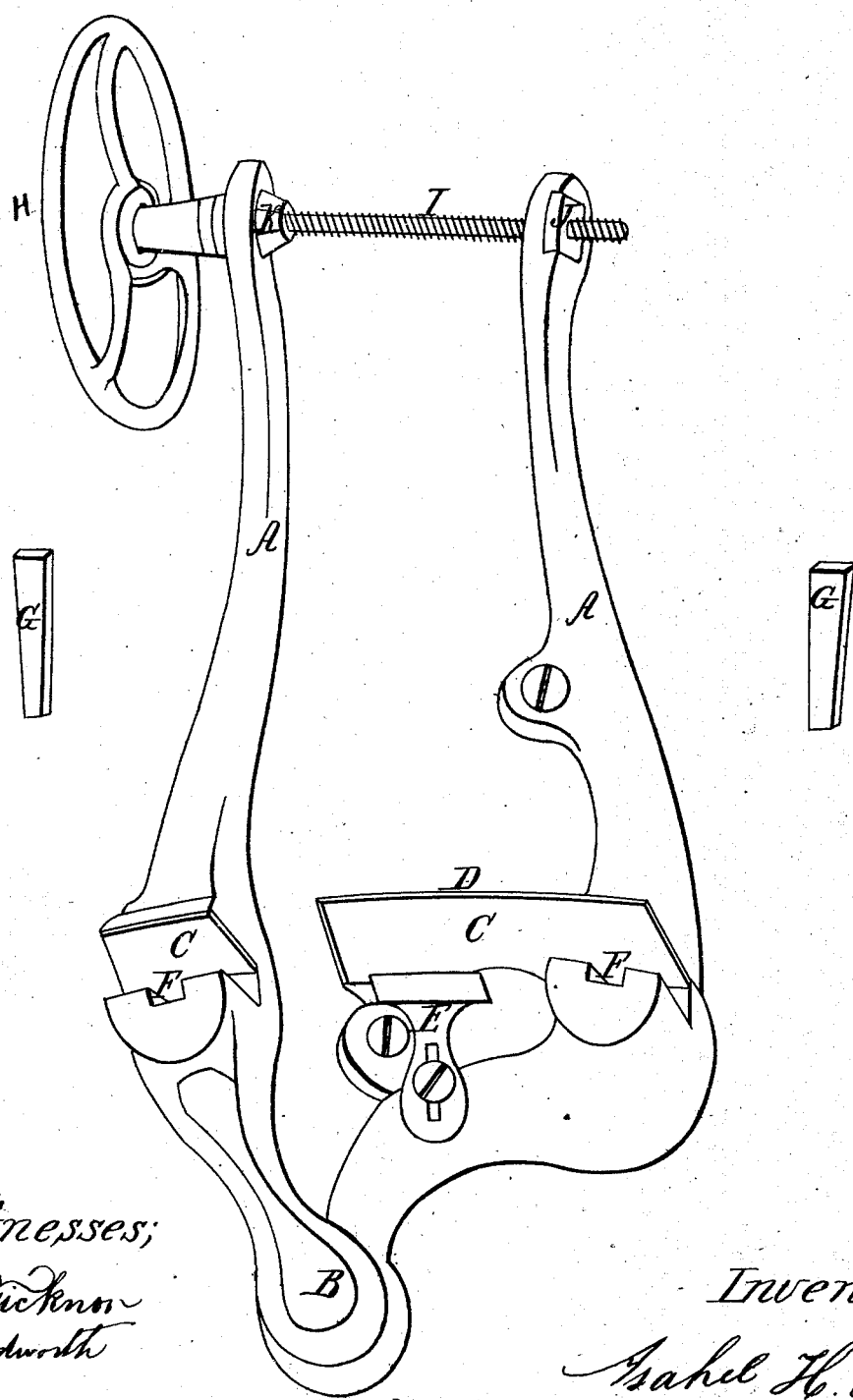

A. H. FORD, OF WILLIAMSFIELD, OHIO.

Letters Patent No. 78,201, dated May 26, 1868.

IMPROVED DEVICE FOR UPSETTING TIRES.

*The Schedule referred to in these Letters Patent and making part of the same.*

TO ALL WHOM IT MAY CONCERN:

Be it known that I, A. H. FORD, of Williamsfield, in the county of Ashtabula, and State of Ohio, have invented a new and useful Machine for Upsetting Wagon-Tire, and any other iron; and I do hereby declare that the following is a full, clear, and exact description of the construction and operation of the same.

The machine is so simple that the annexed drawings of a perspective view will fully show all its parts, and the letters on the drawings show the parts as they are below described.

This machine consists—

First, of two curved arms or levers, A A, of cast iron, the wheel and screw-end to be the front, the left arm to be curved more at the further end of the machine, which forms an eccentric-joint; also, the left arm to be fastened to a bench. The front ends of the arms curve up sufficient to bring the screws on a level with the tire. Second, an eccentric-joint, B, at the further end of the machine, to make it operate more perfectly. Third, consists of two grooves, C C, cut, one in each arm, (about one-third of the distance from the eccentric-joint to the screw,) deep enough to receive the tire edgeways, with a circular projection, D, on the inside of left arm, to support the outside of the tire; also, a slide, E, attached to the left arm by bolt and nut between the groove and eccentric-joint, to support the inside of the tire, and keep it from kinking. Fourth, two mortises, F F, to receive the two keys G G, one in each arm, on the back side of the grooves, extending a little beyond the grooves, to sustain the keys. Fifth, is a wheel, H, attached to a screw, I, running through a hole in the front end of the right arm; also, through a nut, J, fastened to the front end of left arm; also, a ring, K, fastened to the screw on the inside of right arm, to throw the arm back with the screw.

To operate the machine, first have the screw out; then heat the tire or iron, and place it in the grooves; then drive the keys to hold it; also, see that the slide is fastened near the tire, to keep it from kinking; then turn the wheel attached to the screw, to bring the arms near together sufficiently to give the tire the required set, drive out the keys, and hammer the tire slightly if necessary.

What I claim as my invention, and desire to secure by Letters Patent, is—

The combination of levers A A, pivoted together by an eccentric-joint, with adjustable support, E, and screw I, substantially as described.

A. H. FORD.

Witnesses:
M. H. TICKNOR,
L. Z. WOODWORTH.